SIGNAL EVALUATION CIRCUITS

Filed July 1, 1963

INVENTOR
ERNST BEYERLE
BY P.A. Weiss
ATTORNEY

3,299,216
SIGNAL EVALUATION CIRCUITS

Ernst Beyerle, Fellbach, Wurttemberg, Germany, assignor to International Standard Electric Corporation, New York, N.Y., a corporation of Delaware Filed July 1, 1963, Ser. No. 291,912
Claims priority, application Germany, July 6, 1962, St 19,452
7 Claims. (Cl. 179—84)

Figure 1:
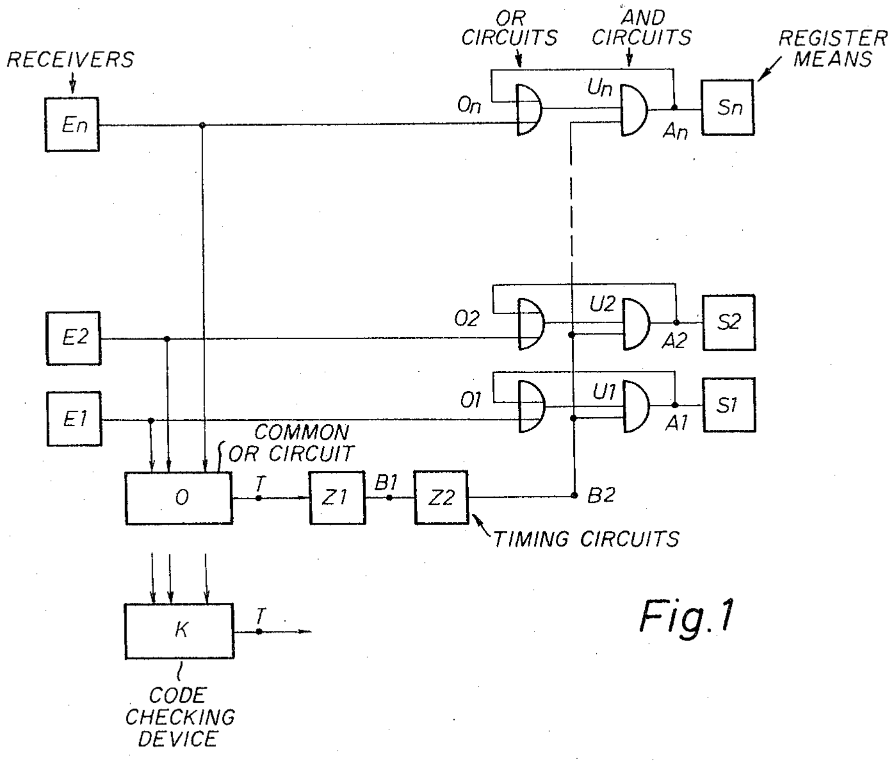

The invention relates in general to multi-frequency code-receiving devices and more particularly to signal evaluation circuits for use with speech-immunity circuit used where the signals are formed of one frequency out of several signal-frequency groups. Such receivers are used where the signal receiver may be affected by speech.

In multi-frequency signalling methods signals may erroneously be produced responsive to speech frequencies. A remedy against these hazards is to provide each receiver with a speech-immunity circuit which blocks the receiver when received voltages have frequencies that deviate from the signal frequency. Accordingly, when there are two signal-frequency groups, the frequencies of one group are kept off the receivers of the other group and vice versa. Despite these speech-immunity circuits in the receivers occasionally wrong signals may occur that are caused by speech-frequency effects. This disadvantage was eliminated in prior art circuits when the receiving devices were provided with a delay time. Therefore, it was necessary to increase the signal pulse width since a signal must have a predetermined minimum duration. Besides, a certain operation time of the receiver is necessary to obtain proper evaluation. Of course this increase in signal length causes a reduction in the signal-transmission velocity.

Another problem is such multi-frequency signalling methods is blocking of the receiver by interfering pulses which occur during a signal. This influence may lead to a double evaluation of a signal.

An object of the invention is to avoid the above described disadvantages in such multi-frequency code-receiving devices and to obtain a safe evaluation device. This is achieved, according to the invention, in that the switching condition of a receiver or a combination of receivers is maintained in that condition after the release of all receivers participating in the signal. This status quo condition remains under the control of a second timing circuit through a certain time period.

Another object of the invention is to provide a signal evaluation circuit for use with speech-immunity circuits wherein the received signal is delayed without reducing the signal transmission velocity.

A related object of this invention is to provide timing circuitry that furnishes a delay time after the receivers are actuated responsive to a certain frequency. This delay is to acertain that the received frequency is a supervisory signal and not a transient or spurious speech signal.

A further related object of this invention is to provide timing circuitry that extends the received signal to enable its proper evaluation and to preclude the double registration of the signal if the receiver is blocked by spurious signals during the receipt of a bona fide signal.

Due to a combination of a protective time and an extension time at the end of the signal the reduction of the signal speed is avoided. The protective time can be selected to be nearly as long as the minimum signal duration. Due to the subsequent individual signal extension there remains sufficient time to evaluate the signal.

In a further embodiment of the multi-frequency code-receiving device according to the invention the time difference at the commencement of the signal is smaller than the time of the signal extension, and the difference between both times is larger than the maximum interfering pulse duration. Any doubling of the signal due to blocking the signal receiver caused by interfering impulse during a signal is avoided.

The protective time at the commencement of a signal and the individual signal extension is achieved according to the invention by an OR and an AND circuit at each receiver output in cooperation with two timing circuits. Thereby both timing circuits affect all AND circuits and moreover, determine the duration of the output signals used for evaluation. The operated OR circuits will be individually actuated after the release of the first AND circuits via the output of the succeeding AND circuits, so that even after the receiver is switched off, the output signals remain for evaluation during the extension time. The evaluation can be initiated depending upon the response of any arbitrary receiver. According to the invention an OR circuit controlled by all receiver outputs, operates the timing circuits. In order to insure speech immunity, operation of the timing circuits is initiated, according to the invention, by a code-checking device only when a genuine signal is applied.

The time periods of the timing circuits are adjusted in a further embodiment of the invention, to the maximum duration of erroneous signals caused by speech signals plus the maximum response time of the register-switching means.

Figure 2:
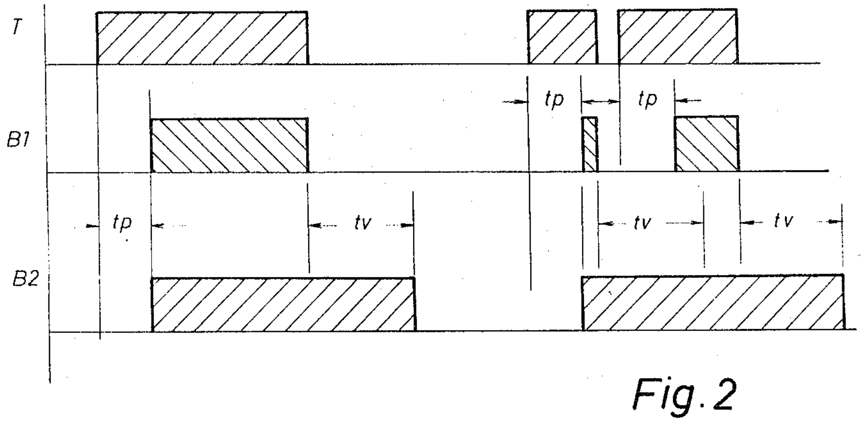

The above mentioned and other objects and features of the invention will become apparent and the invention will be best understood when the specification is read in conjunction with the accompanying drawings comprising FIGURES 1 and 2 in which:

FIG. 1 shows the circuit diagram in principle of the multi-frequency code-receiving device according to the invention, and FIG. 2 shows the time relations during evaluation of a genuine and of an interfered signal.

FIG. 1 shows the multi-frequency code-receiving device schematically. The receivers E1 . . . E*n*, equipped with speech-immunity circuit, only render an output signal, if a genuine signal-frequency combination is at hand. Depending on the code selected only one of the receivers or only a combination of receivers can emit an output signal. To check these output conditions an OR circuit or a code-checking device K is provided which is designed to be responsive to a certain code. Evaluation of the signal is initiated only if this supervising device at the output T indicates a genuine signal.

The output signals of the receivers participating at the signal are connected to the input of the successive OR circuits O1 . . .O*n* and also are connected through these OR circuits to the input of the AND circuit U1 . . . U*n*.

The protective time and the extension time is produced by the two timing circuits Z1 and Z2 respectively. As may be gathered from FIG. 2, the time circuit Z1 emits an output signal after a protective delay time *tp*, if it operated from the output signal T of the OR circuit O or of the code-checking device K. The following timing circuit Z2 responds immediately and releases the valuation through its output signal B2. The signal B2 reaches all second input of the AND circuits U1 . . . U*n*. The AND circuits individually controlled via the OR circuits O1 . . . O*n* are thus made conductive. This correspondingly associated register means S1 . . . S*n* pick up the signal. The output signal A1 . . . A*n* is individually fed-back to the associated OR circuit O1 . . . O*n* so that the signal is still applied, even when the receivers E1 . . . E*n* furnish no more output signal. The switching-off is delayed by the time *tv* controlled by the timing circuit Z2. Thus, when the signal B2 is switched off, the coincidence for the AND circuits U1 . . . U*n* participating on the signal is gone and the time *tv* terminates.

Since the switching condition of the receivers is extended by the feedback paths after the delay *tp*, this protective time *tp* can be selected, in practice to be almost equal to the shortest signal duration at the output of the receivers E1 . . . E*n*. It must only be ascertained that the intercepting AND circuits operate before the receivers are switched off. Since the switching circuits can be designed electronically the AND circuits operate in practice when the output signals B1 and B2 occur.

The extension time *tv* must be selected in such a way that at a shortest possible signal the evaluation signals A1 . . . A*n* are applied long enough to be safely recorded in the register means S1 . . . S*n*. The time *tv* must be adjusted to equal the maximum evaluation period, whereas the time *tp* can be set to equal a time period that is somewhat less than the minimum signal duration.

FIG. 2 shows that when adjusting the magnitudes of the times *tp* and *tv* the maximum interference impulse duration must be considered. Since the receivers are equipped with speech-immunity circuits, interfering impulses, which occur during a signal, interrupt the receiving circuits. This is indicated in FIG. 2 at the second signal. These signal interruptions are recorded by the supervising device O or K at the output T. At the commencement of the interruption the output signal B1 of the timing circuit Z1 is immediately cut-off and the extension time *tv* in the timing circuit Z2 starts to run. If within this time the signal impulse T re-appears, the timing circuit Z2 is again operated by the signal B1 of the timing circuit Z1. Therefore it can be concluded that the difference *tv*–*tp* of the times of both timing circuits marks the maximum interruption time which does not lead to a double registration of a signal that has been interrupted.

While the principles of the invention have been described above in connection with specific apparatus and application, it is to be understood that this description is made only by way of example and not as a limitation on the scope of the invention.

I claim:

1. A multi-frequency code receiving system having a plurality of receivers equipped with speech immunity circuits, first OR gate means connected directly to said receivers and actuated responsive to a signal received by any of said receivers, timing means operated responsive to a signal received from said first OR gate means to delay the start of said signal and to extend the length of said signal, evaluation means comprising a register associated with each of said receivers, control means operated responsive to a coincidence of signals from said receivers and said timing means for controlling the input of signals into said registers, said control means including feedback loop circuitry extending from the output of said control means to the input of said control means, and means for excluding said first OR gate means from said feedback loop circuitry.

2. In the multi-frequency code receiving system of claim 1 wherein said first OR gate means comprises a circuit responsive to the receipt of signals from a combination of said receivers.

3. In the multi-frequency code receiving system of claim 1 wherein said timing means comprises a first timing circuit for delaying the start of said received signal and a second timing circuit means for extending the length of said delayed signal.

4. In the multi-frequency code receiving system of claim 3 wherein the delay time of said first timing circuit means is smaller than the extended time of said second timing circuit means and the difference between the delay time and extended time is larger than the maximum time length of interfering signals capable of actuating the said speech immunity circuits.

5. In the multi-frequency code receiving system of claim 4 wherein said control means comprising second OR gates individual to each of said receivers, AND gate means individually associated with each of said individual OR gates operated responsive to a coincidence of signals received from said individually associated OR gates and from said second timing circuit means, said feedback loop circuitry including, means for connecting the output of said AND gate means to the input of said individually associated OR gates and means responsive to the operation of said AND gate means for registering signals into said associated register.

6. In the multi-frequency code receiving system of claim 5 wherein said first timing circuit delay time is larger than the time duration of spurious signals.

7. In the multi-frequency code receiving system of claim 6 wherein said second timing circuit extend time is equal to the maximum response time required by said registers to evaluate said signals registered in said registers.

References Cited by the Examiner

UNITED STATES PATENTS 3,128,349 4/1964 Boesche et al. -------- 179—84

WILLIAM C. COOPER, *Acting Primary Examiner.*

H. ZELLER, *Assistant Examiner.*